United States Patent
Boutchich et al.

(10) Patent No.: US 8,853,632 B2
(45) Date of Patent: Oct. 7, 2014

(54) PLANAR THERMOPILE INFRARED MICROSENSOR

(75) Inventors: Mohamed Boutchich, Evin Malmaison (FR); Benoit Bataillou, Lyons (FR)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 838 days.

(21) Appl. No.: 13/062,873

(22) PCT Filed: Sep. 7, 2009

(86) PCT No.: PCT/IB2009/053896
§ 371 (c)(1),
(2), (4) Date: Aug. 30, 2011

(87) PCT Pub. No.: WO2010/029488
PCT Pub. Date: Mar. 18, 2010

(65) Prior Publication Data
US 2011/0305258 A1    Dec. 15, 2011

(30) Foreign Application Priority Data
Sep. 9, 2008   (EP) ..................................... 08105283

(51) Int. Cl.
G01J 5/20     (2006.01)
G01J 5/00     (2006.01)
G01J 5/12     (2006.01)
G01J 5/08     (2006.01)
G01J 5/02     (2006.01)

(52) U.S. Cl.
CPC .................. *G01J 5/12* (2013.01); *G01J 5/0806* (2013.01); *G01J 5/022* (2013.01); *G01J 5/0853* (2013.01); *G01J 5/0815* (2013.01)
USPC ........................................ 250/338.1; 374/130

(58) Field of Classification Search
CPC ......... H01L 35/28; H01L 35/32; H01L 35/30; H01L 37/00
USPC ........................................ 250/338.1; 374/130
See application file for complete search history.

(56) References Cited

U.S. PATENT DOCUMENTS

| | | | |
|---|---|---|---|
| 5,393,351 A * | 2/1995 | Kinard et al. | 136/225 |
| 6,828,560 B2 * | 12/2004 | Lambert et al. | 250/353 |
| 2006/0169902 A1 * | 8/2006 | Watanabe | 250/338.1 |
| 2008/0017236 A1 * | 1/2008 | Perlo et al. | 136/201 |

OTHER PUBLICATIONS

"Accessing Surface Plasmons with Ni Microarrays for Enhanced IR Absorption by Monolayers", J. Phys. Chem. B 2003, 107, 11871-11879 to Williams et al.*

* cited by examiner

*Primary Examiner* — David Porta
*Assistant Examiner* — Kenneth J Malkowski
(74) *Attorney, Agent, or Firm* — McClure, Qualey & Rodack, LLP

(57) ABSTRACT

An IR sensor comprises a heat sink substrate (10) having portions (12) of relatively high thermal conductivity and portions (14) of relatively low thermal conductivity and a planar thermocouple layer (16) having a hot junction (18) and a cold junction (20), with the hot junction (18) located on a portion (14) of the heat sink substrate with relatively low thermal conductivity. A low thermal conductivity dielectric layer (22) is provided over the thermocouple layer (16), and has a via (24) leading to the hot junction (18). An IR reflector layer (26) covers the low thermal conductivity dielectric layer (22) and the side walls of the via (24). An IR absorber (30; 30') is within the via. This structure forms a planar IR microsensor which uses a structured substrate and a dielectric layer to avoid the need for any specific packaging. This design provides a higher sensitivity by providing a focus on the thermocouple, and also gives better immunity to gas conduction and convection.

21 Claims, 2 Drawing Sheets

PLANAR THERMOPILE INFRARED MICROSENSOR

CROSS-REFERENCE TO RELATED APPLICATION

This application is a co-pending application which claims priority to PCT Application No. PCT/IB2009/053896, filed Sep. 7, 2009, entitled "Planar Thermopile Infrared Microsensor," which claims priority to European Patent Application No. 08105283.9, filed on Sep. 9, 2008 each of these applications being incorporated herein by reference in their entirety.

This invention relates to infrared sensors.

Infrared temperature sensors have been used for many years in process control and manufacturing, and are now increasingly being used for automotive applications. Silicon thermopiles, when manufactured at costs low enough for automotive use, generate very low level output signals. As a result, signal amplification and calibration become difficult with "off the shelf" generic low cost components, as a result of noise issues.

Miniature infrared sensors are generally formed of three functional parts. First, a radiation absorbing coating is used, which selects the bandwidth. Next, a thermopile detector converts temperature differences into voltages by the Seebeck effect. A thermopile is essentially an arrangemenet of one or more thermocouples. Finally, the substrate of the thermopile detector is mounted on a heat sink, which stabilizes the temperature of the sensor.

When using silicon technology, it is necessary to take account of the high thermal conductivity of the silicon substrate. One solution is to use micro-machined suspended structures, such as membranes or cantilevers. The hot junctions are gathered in the vicinity of an absorbent zone located on a membrane or a cantilever with low thermal conductivity, thereby minimizing the conduction heat losses. The cold junctions are located on a heat sink, generally the silicon substrate. This configuration gives high thermal resistance between the hot and cold junctions of the thermocouple, and thus enables high sensitivity.

A variety of such thermoelectric sensors integrated on a silicon wafer and using polysilicon for the thermopile are already available. However, the significant thermal dissimilarity between the two types of thermojunctions makes these sensors highly sensitive to gas conduction and convection phenomena. The devices therefore have to be formed as encapsulated structures.

As a result, the required packaging gives rise to reliability and cost issues.

There have been proposals for package free sensors, for example as described in the article "Package-free infrared micro sensor using polysilicon thermopile" by M. Boutchich et al, Sensors and Actuators A 121 (2005) 52-58.

According to the invention, there is provided an IR sensor, comprising:

a heat sink substrate having portions of relatively high thermal conductivity and portions of relatively low thermal conductivity;

a planar thermocouple layer having a hot junction and a cold junction, with the hot junction located on a portion of the heat sink substrate with relatively low thermal conductivity;

a low thermal conductivity dielectric layer over the thermocouple layer, and having a via leading to the hot junction;

an IR reflector layer which covers the low thermal conductivity dielectric layer and the side walls of the via, an opening being provided in the IR reflector layer at the location of the hot junction; and an IR absorber within the via.

This structure forms a planar IR microsensor which uses a structured substrate and a dielectric layer to avoid the need for any specific packaging. The hot and cold junctions are distributed, with the hot junctions provided at a low thermal conductivity portion of the substrate. The IR reflector layer implements a radiative heat pipe, which is patterned onto the sensor in place of the previously known planar radiative coating. This heat pipe provides a higher sensitivity by providing a focus on the thermocouple, and also gives better immunity to gas conduction and convection.

Preferably, the sensor further comprises an integrated lens element provided over the via. This provides additional focusing to the thermocouple function and thereby increases the sensitivity.

The IR absorber can fill the via, or else the IR absorber can be only at the base of the via over the hot junction. In the latter case, the remainder of the via volume can be vacuum sealed.

The integrated lens can comprise a microlens, for example of fused silica, silicon or pyrex.

The cold junction is preferably also located on a portion of the heat sink substrate with relatively low thermal conductivity. The heat sink substrate can comprise a base layer and a structured heat sink layer.

The planar thermocouple layer preferably comprises a plurality of thermocouples in series, each thermocouple having a hot junction and a cold junction, with each hot junction located on a portion of the heat sink substrate with relatively low thermal conductivity.

Examples of the invention will now be described with reference to the accompanying drawings, in which.

Known infrared sensors typically use a one or four element chip mounted onto a sealed TO-46 or TO-18 package that also includes filters and filling gases. Usually an inert atmosphere, such as Krypton, is used in order to enhance the device performance. It is known to use a distributed planar configuration for the thermocouple detector, and to provide integration of the IR filter onto the substrate. This enables a thin sensor to be formed.

The invention improves the known design, but still making use of a distributed thermocouple design with integrated IR filter. The invention makes use of a guide structure, which can be considered to be in the form of a heat pipe, which allows the IR radiation to be focused on one thermocouple junction. Furthermore, the directivity, namely the field of view, of the sensor can be greatly improved allowing precise targeting.

Figure 1:
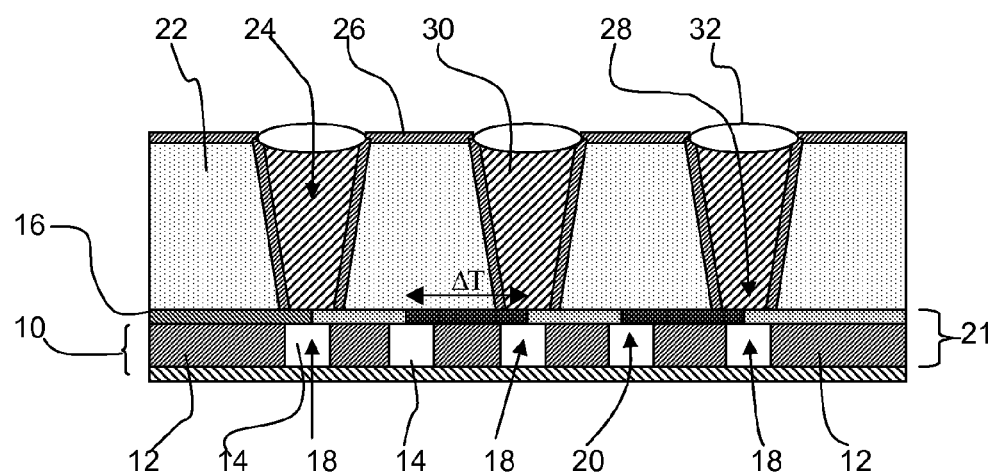
FIG. 1 shows a first example of sensor structure in accordance with the invention.

FIG. 1 shows a first example of sensor structure in accordance with the invention.

The sensor comprises a heat sink substrate 10 having portions 12 of relatively high thermal conductivity and portions 14 of relatively low thermal conductivity. The substrate can be a silicon substrate which defines the high thermal conductivity portions 12, and silicon oxide portions can define the low thermal conductivity portions. Thus, an STI (shallow trench isolation) substrate can be used.

A planar thermocouple layer 16 has a series of hot junctions 18 and cold junctions 20. The layer 16 together with the underlying substrate define the thermopile structure.

At least the hot junctions 18 are located on a portion 14 of the heat sink substrate with relatively low thermal conductivity.

A low thermal conductivity dielectric layer 22 is provided over the thermocouple layer 16, and has a via 24 leading to each hot junction 18. The dielectric can be implemented as a spin on gel. The dielectric layer is coated with an IR reflector layer 26 which covers the low thermal conductivity dielectric 22 and the side walls of the each via 24. An opening 28 is provided in the IR reflector layer 26 at the location of the hot junction. An IR absorber 30 is provided within the via. The IR reflector layer can be an Au layer which is sputtered and opened on top of the thermocouple hot junction.

In the example shown, the cold junctions are also provided at regions of relatively low thermal conductivity, so that heat gradients can be maximised.

This design provides an IR heat pipe which is integrated into the chip structure. The operating principle of the sensor corresponds to the prior art, based on the thermoelectric effect. The temperature gradient is maintained by increasing the thermal resistance under the thermocouples.

The temperature gradient is furthermore multiplied owing to the focus of the heat pipe on the thermocouple. The heat pipe additionally provides improved directivity towards the target by adjusting the field of view.

The configuration requires no specific packaging because the thermocouple layer 16 is fully integrated into the structure, with no passages for gas flow between different sections of the thermocouple layer. This minimizes the manufacturing cost and non-linearities in the performance, compared with existing implementations.

The hot and cold junctions are distributed over a substrate with portions of high contrast in thermal conductivity, so as to minimize the influence of parasitic convection, but without requiring vacuum or Xenon gas packaging.

Materials that provide a good absorptivity in the IR bandwidth of interest are typically utilized as the IR absorber, whereas metals with suitable IR reflectivity are implemented as the IR reflector.

The resulting IR filter is directly built on the chip and is not part of a separate package.

FIG. 1 shows a further optional feature, of a microlens 32 over each via 24. These are also integrated onto the chip. The microlenses can be formed from silicon or using a polymer reflow, for example using the same polymer as IR absorber 30. In this way, each hot junction receives focused radiation that increases the sensitivity to illumination and minimizes the non-linearity usually observed in known package devices. In addition, the volume of the final device is dramatically reduced, for example with a thickness of the order of a few hundred μm.

Bulk or surface micromachined structures such as low stress membranes can be patterned to provide the structure for supporting the hot and cold junctions. For example, a silicon substrate can be recessed, and filled to provide the desired thermal resistance required to maintain a large temperature gradient. The devices can be arranged in arrays so as to generate a combined sense voltage. In a pixel configuration, each cell (of one or more thermocouples) can be addressed to provide a low cost IR imaging solution.

The symmetrical configuration shown in FIG. 1 allows the device to have some immunity to convection. On average, the temperature distribution on the surface of the sensor will be uniform. The loss due to convection is significantly reduced since the temperature differences are concentrated at the embedded junctions.

The resulting chip can be mounted on a chip carrier with standard signal processing electronics, and using standard connection technologies. As in standard thermocouples, the device only measures temperature differences. Thus, an absolute temperature reference sensor can be used to enable absolute temperature to be derived. For highest accuracy and reliability, an absolute temperature sensor (thermistor/Pt100) can be provided directly on the chip die, next to the cold junctions of the thermopile substrate, for example at the periphery of the thermopile.

The example shown in FIG. 1 uses a substrate with two different materials. Instead, a patterned silicon substrate defining a mesh of membranes can be used, with a void (air) between the membranes. For example, these membranes can be attached to a low mechanical stress membrane of low thermal conductivity, for example silicon nitride or silicon oxide.

Figure 2:
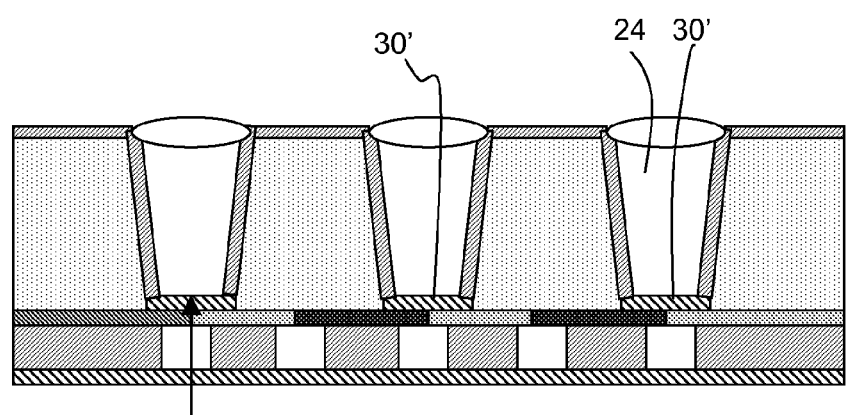
FIG. 2 shows a second example of sensor structure in accordance with the invention.

FIG. 2 shows a second example of device in accordance with the invention. This differs from FIG. 1 only in respect of the IR absorber, and for this reason, a description of the other components is not repeated.

In FIG. 2, the IR absorber 30' is only at the base of the via over the hot junction. The remainder of the via volume can be vacuum sealed, with the microlens acting as the seal. Using this configuration, a faster response time can be obtained as a result of the shorter thermal coupling path to the hot junction.

Figure 3:
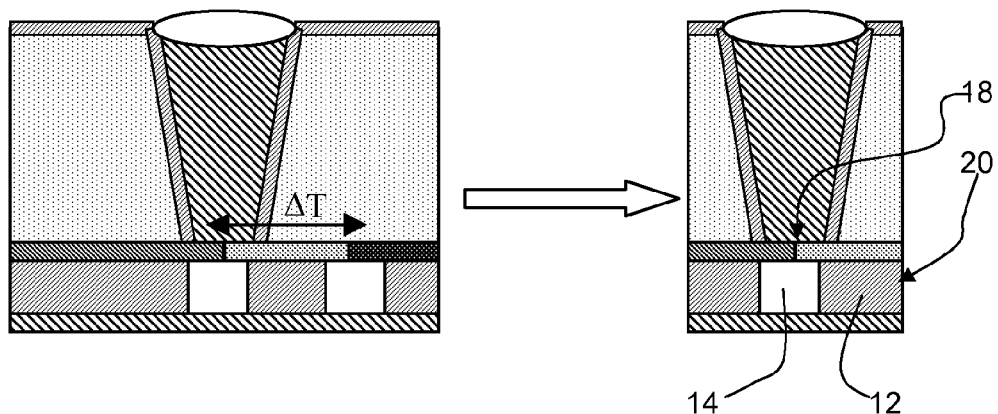
FIG. 3 shows a third example of sensor structure in accordance with the invention.

FIG. 3 shows an asymmetric configuration of the thermojunctions in which the cold junction 20 is thermally coupled to the silicon substrate. Thus, portions 14 of low thermal conductivity are provided only at the hot junctions 18. This allows a higher integration density of the hot junctions. Immunity to convection is maintained as the hot junction is again embedded in the structure of the IR pipe.

Infrared sensors allow a direct, fast, more accurate measurement of temperature, for example for use in automotive applications (for controlling passenger comfort), in remote detection applications (security, household applications (non contact temperature measurements). Thermal detection can also be used for low cost imaging applications, using an array of thermal sensors.

The chip can be mounted on a single chip carrier without any specific encapsulation thus minimizing the volume occupied. The configuration is thus cost effective from a packaging perspective but also low cost electronics can be utilized for the required signal processing as a result of the improved sensitivity and larger generated signal.

In the examples above, an IR absorber layer and reflector layer are used, to provide the desired frequency filtering. An alternative is to provide the filtering by using a surface Plasmon effect.

When light passes through a tiny (sub-wavelength size) hole, Bethe predicted an extinction based on the $4^{th}$ power of the ratio of wavelength to hole size. However, recent experiments have shown that when the hole is made in a metal layer the transmitted intensity increases. This effect is considered to result from an "antenna" effect.

If the material around the hole is a metal, in certain conditions, the incident beam (the electromagnetic wave) will cause oscillations, and a surface wave will propagate through the hole. On other side of the hole this oscillation will "recreate" the light beam. At this point, there will also be diffraction effects, but the filtering comes from the propagation of a surface wave. This phenomenon is called Surface Plasmon Oscillation or Surface Plasmon Resonance (SPR).

In addition to this effect, the transmission (or indeed reflection) is different for different wavelengths.

This filtering can be used in the device of the invention to provide the desired frequency filtering. The filter can be formed by patterning an array of holes in a metal film, for example a silver film. The holes can be formed by ion-beam milling.

When the structure receives incident electromagnetic radiation, the transmitted frequency is determined by the period of the array. When white light passes through an array of sub-wavelength holes, the wavelength corresponding to a maximum intensity can be expressed using formula 1:

$$\lambda \sqrt{i^2 + j^2} \cong p \sqrt{\frac{\varepsilon_m \varepsilon_d}{\varepsilon_m + \varepsilon_d}} \qquad \text{Formula 1}$$

Formula 1 gives the central frequency ($\lambda$). The hole pitch is p, $\varepsilon_m$ is the dielectric constant of the substrate and $\varepsilon_d$ is the effective dielectric constant of the material filling the aperture.

i and j are the orders of the array. For a square array of period p, a central wavelength will be obtained at the array with the period p, but also for 2p (considering an array made from alternate holes), and for 3p etc. Thus, an array with pitch p can be considered as the superposition of multiple sub-arrays of larger pitch. As the array is 2D, sub-arrays can also be derived with a pitch based on diagonal dimensions from the basic array. As a result, the terms based on i and j values represents the possible pitch dimension for sub arrays that can be considered to be superposed to form the array. However, the main intensity however is for low i and j numbers, (in a similar way to diffraction orders calculations). In general, the values i=1 and j=0 or i=0 and j=1 can be considered, so that the term with i and j can be ignored for the principal wavelength transmitted. In this case:

$$\lambda \cong p \sqrt{\frac{\varepsilon_m \varepsilon_d}{\varepsilon_m + \varepsilon_d}}$$

The influence of the hole size is not reflected in Formula 1. Generally, the holes need to be of sub-wavelength dimensions, or light just directly goes through. A diameter corresponding to at most half of the wavelength of the light to be transmitted is appropriate. When the pitch of the holes has been determined to obtain the desired filtering, the hole size clearly needs to be smaller than that pitch, and preferably smaller than half the pitch.

The use of this type of absorber enables a single layer to define both the IR absorber and the reflector. No holes are provided in the region of the reflector (above the cold junctions) and the selective filtering is provided only in the area of the hot junctions.

The sensor can be fabricated using CMOS technology. For example, a CMOS wafer can be used as the STI substrate.

Various modifications will be apparent to those skilled in the art.

The invention claimed is:

1. An IR sensor, comprising:
 a heat sink substrate having portions of relatively high thermal conductivity and portions of relatively low thermal conductivity;
 a planar thermocouple layer having a hot junction and a cold junction, with the hot junction located on a portion of the heat sink substrate with relatively low thermal conductivity;
 a dielectric layer over the thermocouple layer, and having a via leading to the hot junction;
 an IR reflector layer which covers the dielectric layer and the side walls of the via, an opening being provided in the IR reflector layer at the location of the hot junction; and
 an IR absorber within the via, wherein the IR absorber fills the via.

2. The sensor as claimed in claim 1, further comprising an integrated lens element provided over the via.

3. The sensor as claimed in claim 2, wherein the integrated lens comprises a microlens.

4. The sensor as claimed in claim 3, wherein the microlens is fused silica, silicon or pyrex.

5. The sensor as claimed in claim 1, wherein the cold junction is located on a portion of the heat sink substrate with relatively low thermal conductivity.

6. The sensor as claimed in claim 1, wherein the heat sink substrate comprises a base layer and a structured heat sink layer.

7. The sensor as claimed in claim 1, wherein the heat sink substrate comprises a silicon substrate.

8. The sensor as claimed in claim 7, wherein the portions of relatively low thermal conductivity comprise silicon oxide portions of a shallow trench isolation substrate.

9. The sensor as claimed in claim 1, wherein the IR absorber comprises a layer having an array of holes.

10. The sensor as claimed in claim 1, wherein the planar thermocouple layer comprises a plurality of thermocouples in series, each thermocouple having a hot junction and a cold junction, with each hot junction located on a portion of the heat sink substrate with relatively low thermal conductivity.

11. An IR sensor, comprising:
 a heat sink substrate having portions of relatively high thermal conductivity and portions of relatively low thermal conductivity;
 a planar thermocouple layer having a hot junction and a cold junction, with the hot junction located on a portion of the heat sink substrate with relatively low thermal conductivity;
 a dielectric layer over the thermocouple layer, and having a via leading to the hot junction;
 an IR reflector layer which covers the dielectric layer and the side walls of the via, an opening being provided in the IR reflector layer at the location of the hot junction; and
 an IR absorber within the via,
 wherein the cold junction is located on a portion of the heat sink substrate with relatively low thermal conductivity.

12. The sensor as claimed in claim 11, further comprising an integrated lens element provided over the via.

13. The sensor as claimed in claim 11, wherein the IR absorber is at the base of the via over the hot junction.

14. The sensor as claimed in claim 13, wherein the remainder of the via volume is vacuum sealed.

15. The sensor as claimed in claim 12, wherein the integrated lens comprises a microlens.

16. The sensor as claimed in claim 15, wherein the microlens is fused silica, silicon or pyrex.

17. The sensor as claimed in claim 11, wherein the heat sink substrate comprises a base layer and a structured heat sink layer.

18. The sensor as claimed in claim 11, wherein the heat sink substrate comprises a silicon substrate.

19. The sensor as claimed in claim 18, wherein the portions of relatively low thermal conductivity comprise silicon oxide portions of a shallow trench isolation substrate.

20. The sensor as claimed in claim 11, wherein the IR absorber comprises a layer having an array of holes.

21. The sensor as claimed in claim 11, wherein the planar thermocouple layer comprises a plurality of thermocouples in series, each thermocouple having a hot junction and a cold junction, with each hot junction located on a portion of the heat sink substrate with relatively low thermal conductivity.

\* \* \* \* \*